Dec. 8, 1964    G. K. MEDICUS ETAL    3,160,391
VALVE SEATS FOR HIGH TEMPERATURE AND HIGH VACUUM ENVIRONMENTS
Filed Jan. 24, 1962    3 Sheets-Sheet 1

INVENTORS
GUSTAV K. MEDICUS
WERNER F. JEHN
BY

ATTORNEYS

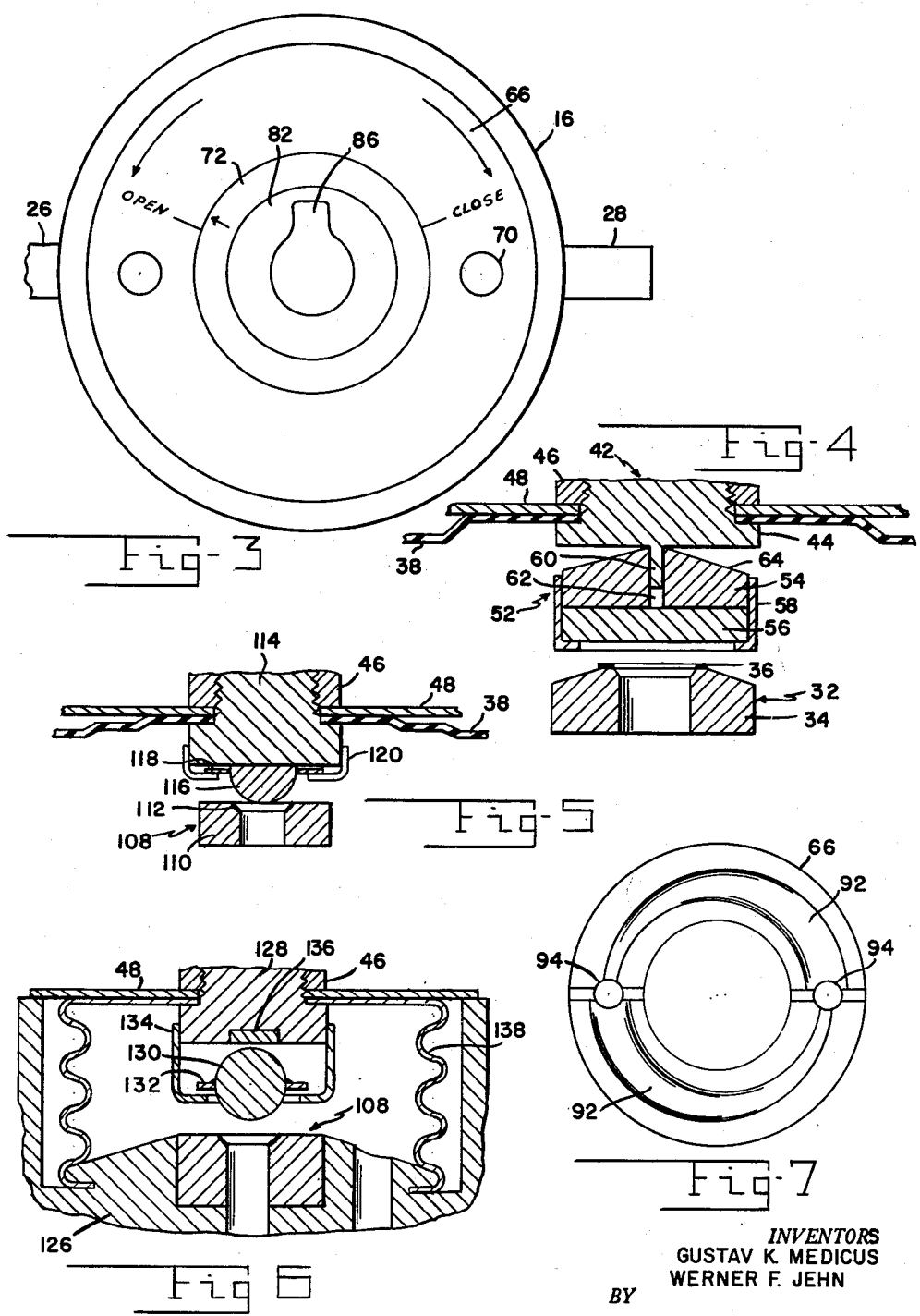

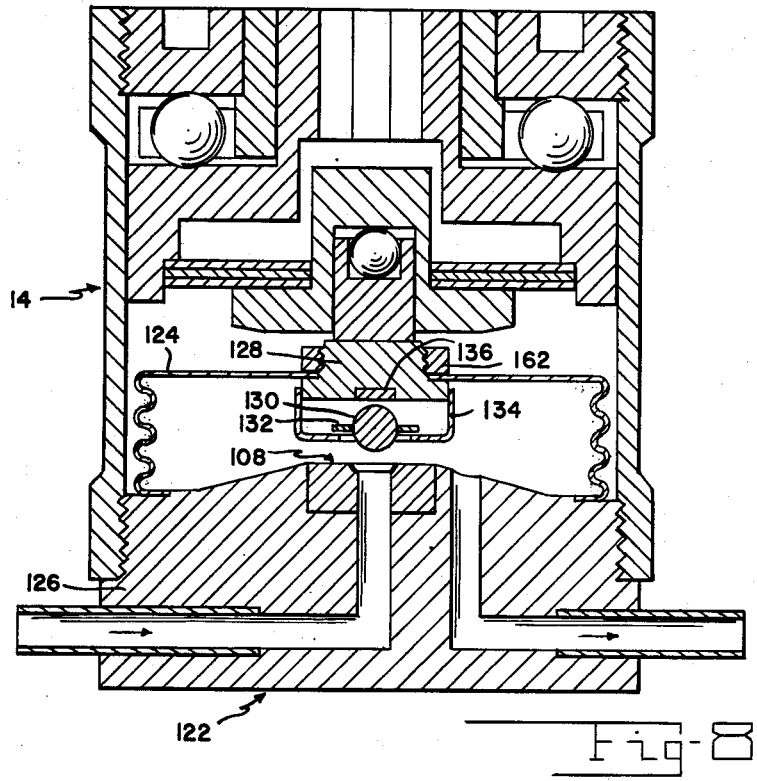

United States Patent Office 3,160,391
Patented Dec. 8, 1964

3,160,391
VALVE SEATS FOR HIGH TEMPERATURE AND HIGH VACUUM ENVIRONMENTS
Gustav K. Medicus, 7521 W. Hyland, and Werner F. Jehn, 438 Twinning Drive, both of Dayton, Ohio
Filed Jan. 24, 1962, Ser. No. 168,558
7 Claims. (Cl. 251—364)
(Granted under Title 35, U.S. Code (1952), sec. 266)

This is a continuation-in-part application of application Serial No. 93,812, filed March 6, 1961, now abandoned.

The invention described herein may be manufactured and used by or for the United States Government for governmental purposes without the payment to us of any royalty thereon.

This invention specifically relates to valves and sealing devices used in connection with pressure and vacuum systems subjected to high temperatures.

Typical applications of this invention are in the field of high vacuum work, in research in gaseous electronics, and in research with pure gases. In such research areas, there is a critical need for valves which can effectively seal off or isolate an evacuated system, or one containing gases of extreme purity to thereby prevent contamination.

Previous valves used in applications to which this invention pertains have suffered from one or more of the following disadvantages:

(1) The extremely high pressure of the plug against the seat, required to prevent seepage, could only be generated with considerable torque, and required valves which had to be bolted to a firm support, as against being supported by the piping or tubing to which they are connected.

(2) The leakage rate of the valves increased as the number of operating cycles increased; and (3) The extremely high pressure between the plug and seat produced distortion of the components, and resulted in very short-lived valves.

Bakeable valves designed to withstand high temperatures are required on apparatus used to conduct work with high vacuum or with pure gases. The entire system, in order to prevent contamination must be "degassed" to drive out contaminants including such residual air or other gases which normally cling to the walls and other interior surfaces of the apparatus. The bulk of the contaminants may be driven out by heating the apparatus to a high temperature, say 500° C. for a predetermined time. On vacuum apparatus, all tubes, pipes and accessories should be as short as possible to produce the best flow characteristics, and a system which is easiest to decontaminate. For these reasons, valves are placed as near the main elements of the apparatus as possible. Since the interior of the valves must be included with the interior of the apparatus, the valves must also be heated for decontamination. The required ability to withstand high temperature definitely limits materials which may be used to construct valve components and eliminates any conventional materials normally used in valve construction.

The all-metal bakeable valves presently in use, which have attempted to achieve low leakage rates, usually employ a soft metal seat which undergoes plastic deformation when a hard metal plug is pressed against it.

Experience has shown that usual valves of this type are satisfactory for only one closing, and that on subsequent closings, the rate of leakage will grow even though increasing pressure is applied to the valve plug.

The reason for the increasing leakage rate is that with the first valve closing, the soft metal seat in plastically deformed and workhardened by the extreme unit pressure applied by the plug. When the valve is again closed, the workhardened surface on the seat cannot be made to accommodate itself to the mating surface on the plug which inevitably is covered with microscopic crevices and roughness. If pressure on the plug is increased, the metal below the workhardened surface will yield and prevent the build up of enough pressure to produce a tight seal. If the soft seat is confined in a cavity within a harder metal body such as Monel or stainless steel, some improvement will result. However, if enough pressure is applied to influence the workhardened surface, this same pressure is sufficient to also produce structural deformation of the harder metal body backing up the soft seat.

A primary object of this invention is to provide a valve with an extremely low leakage rate.

Another object of this invention is to provide a valve constructed to withstand repeated bake-out.

Still another object of this invention is to provide a valve producing a tight seal with minimum actuating force.

Yet another object of this invention is to provide a valve which is relatively small and lightweight, and supportable by the pipes or tubes to which attached.

A further object of this invention is to provide a valve having a leak-resistant seat which will in a unique manner overcome the usual ill effects of work hardening.

While the invention to be shown and described is for convenience in regard to high vacuum apparatus, it is to be understood that it is not our intent and purpose to limit our invention to such use. Accordingly, additional objects, advantages and features of the invention reside in the construction, arrangement and combination of parts involved in the embodiment of the invention as will appear from the following description and accompanying drawings wherein:

FIG. 3 is a plan view of the valve.

FIG. 4 is an enlarged cross-sectional detail of the valve plug and valve seat.

FIG. 5 is an enlarged cross-sectional detail of the valve plug and valve seat of another embodiment of this invention.

FIG. 6 is an enlarged cross-sectional detail of the valve plug and valve seat used in the embodiment shown by FIG. 8 and having an optional spring 48 added.

FIG. 7 is an inverted plan view in reduced scale along line 7—7 on FIG. 1 and showing the upper bearing race with ball races, and FIG. 8 is a vertical cross section of another embodiment of the invention, similar to the embodiment shown by FIG. 1.

Figure 1:
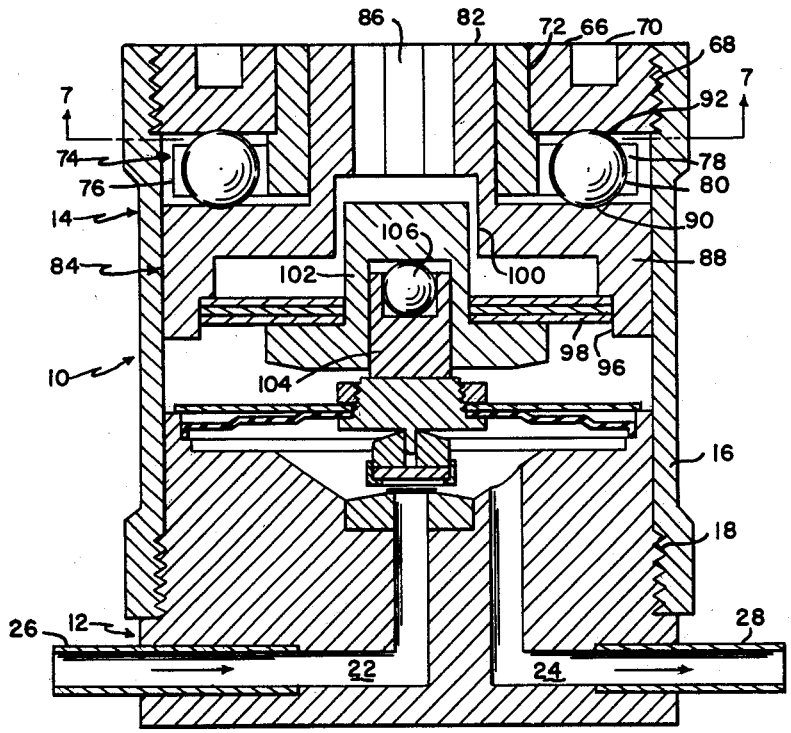
FIG. 1 is a vertical cross section of the valve in its open position, and with the actuating unit in engagement with the valve unit.
Figure 2:
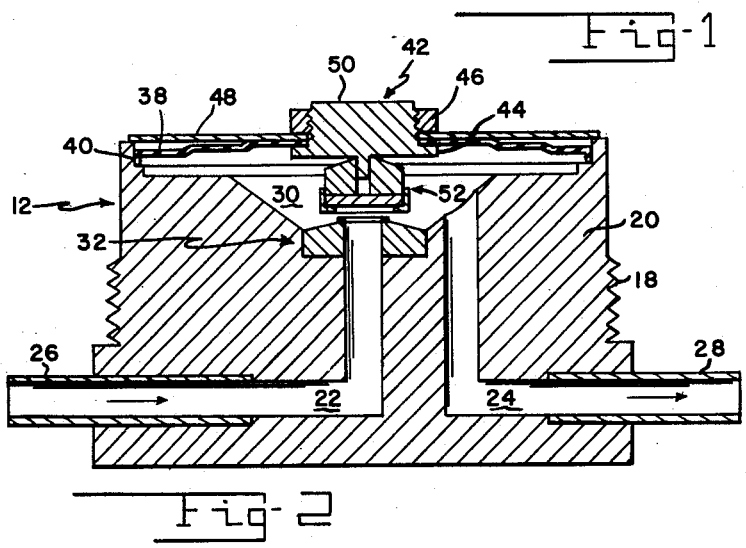
FIG. 2 is a vertical cross section of the valve unit only.

Referring in particular to FIG. 1 and FIG. 2, the valve assembly referred to generally as valve 10, comprises a valve unit 12 and an actuating unit 14. The actuating unit 14 includes a sleeve 16 having internal threads for engaging with external threads 18 on valve unit 12.

Referring to FIG. 2, valve unit 12 has a body 20 made of suitable ferrous alloy. Flow passages 22 and 24 are machined into the body, substantially as shown. Each flow passage is counterbored to receive a tube such as tube 26 and tube 28. The tubes may be of any suitable metallic material and may be brazed or welded into place in order to assure leak-proof junctures. The tubes are to be of suitable size for joining the valve directly into a flow line of the apparatus with which it is to be used. The valve may be mounted to the apparatus in such manner that, while the apparatus is being evacuated, the flow will be in the direction indicated by the arrows.

The upper end of body 20 contains a cavity 30 of any convenient shape and bored at its lower end to receive valve seat 32. The valve seat may be brazed or otherwise joined to body 20 in any suitable manner to assure a leak-proof juncture.

Referring to FIG. 4, which shows the valve seat and cooperating valve plug in enlarged detail, the valve seat 32 consists of a valve seat body 34 and a seat facing 36. The valve seat body 34 may be made of tungsten carbide or other suitable material having a comparable modulus of elasticity, and further having heat resistance and structural rigidity under high compression. The seat facing 36 may be any material which is sufficiently softer than the valve seat body 34 to which it must be joined and which is physically and chemically suitable for the particular application. For example: gold and silver would be physically suitable, but not chemically suitable in an environment having even traces of mercury, whereas platinum would be physically suitable and would remain chemically nearly unaffected in such environment. Depending upon the particular application, suitable materials may include iron, aluminum, copper, the softer ferrous and nonferrous alloys, silver, gold and platinum. The seat facing may be made of thin foil which is diffused to the valve seat body or it may be made of powder which is sintered in place.

The seat facing 36, which, for purposes of illustration, is assumed to be platinum, may be made from foil of say .002 inch thickness and diffusion bonded under heat and pressure to a smoothly ground face of the valve seat body. It has been found from experience that an extremely satisfactory seat may be produced by placing the valve seat body 34 and seat facing 36 into a suitable holding fixture in which pressure may be applied to force the platinum foil against the tungsten carbide valve seat body; and, while the pressure is being applied, to heat the assembly for from one to two hours at 650° to 750° centigrade in an oven having a hydrogen or reducing atmosphere. Noble gases such as helium or argon would also provide a suitable atmosphere as well as inert gases such as nitrogen. The gases could also be used in combination. During this processing, the free face of the foil should be covered with a flat to which the platinum will not adhere. The flat, for which sapphire is a suitable material, gives assurance of providing a smooth and uniform valve seat. During the process of heating in the oven, the platinum foil will become firmly bonded or diffused to the tungsten carbide. When forming a spherical valve seat such as valve seat 108 shown on FIG. 5, a sapphire ball may be used to apply necessary pressure to facing 112.

Again referring to FIG. 2 and FIG. 4, cavity 30 in body 20 is counterbored to receive a flexible member such as diaphragm 38. The diaphragm has a turned edge 40 which slidably enters the counterbore in the body where it is brazed in place to form a leak-proof juncture. The diaphragm may be made of any suitable material which is noncorrosive in the environment with which used and which has a degree of yieldability or flexibility. The center of the diaphragm 38 is bored to receive the threaded shank of valve plug carrier 42. The valve plug carrier 42 has a flange 44 for supporting the bottom side of the diaphragm and a threaded shank for engaging nut 46. Superimposed on the diaphragm and also held in place by nut 46 is a circular or disk-shaped flat spring 48 having its outer edge supported by the top surface of body 20 and biased to hold the valve plug carrier in its upper or open position. The diaphragm must be brazed or otherwise joined to the valve plug carrier in order to provide a leak-proof juncture. The upper face 50 of valve plug carrier 42 receives the applied force from actuating unit 14 in a manner to be hereinafter described.

Referring more specifically to FIG. 4, valve plug 52 consists of a block 54 faced with a flat face 56 held in place by ferrule 58, the upper edge of which may be brazed or spot welded to block 54. Flat 56 is preferably made of sapphire, although tungsten carbide may be substituted. If desired, valve plug 52 may be made in one piece of a material such as tungsten carbide and having a ground and polished face. Valve plug carrier 42 has an integral flexibly protruding pin 60, which engages, with a light press fit, the bore 62 in block 54. The upper end of block 54 terminates in conical surface 64. The conical surface 64 combined with the action of flexible pin 60 is such as will permit flat 56 to find its own natural seat against seat facing 36 when pressure is applied by actuating unit 14.

The action of flat 56 against seat facing 36 results in a leak-proof closure which has no deterioration in spite of repeated operating cycles. This desired result is brought about by a proper selection of materials, by extremely precise fabrication, and by the phenomenon of a thin ductile facing on the valve seat. It is well known that when a piece of ductile material, having a high width to thickness ratio, is placed between two smooth, hard faced and structurally rigid bodies, the ductile metal cannot be squeezed in its entirety from between the bodies regardless of the compressive force applied. This phenomenon may be explained by stating that the unit pressure tends to be greatest at the center of the ductile material and diminishes toward the outer edges. Thus, if enough pressure is applied to cause the center of the ductile strip to become plastic, any flow of the plastic material is resisted by the surrounding material which is stressed below the elastic limit. Should there be any initial spreading of the ductile material from its initial dimensions, the width of the material will increase and result in an increase in the unit pressure gradient between the center and edges of the material to further resist any spreading. Ultimately, a balance must be reached. As used in this invention, the seat facing 36, when partially in a plastic state, will effectively seal microscopic scratches and blemishes on flat 56.

It will be noted that the valve unit above described is all-metallic (unless a sapphire flat is used) and of materials suitable for repeated bake-outs in contemplated applications. The valve unit is actuated by the actuating unit described below.

Referring to FIG. 1, the valve actuating unit 14 comprises sleeve 16 and all elements housed therein which are not shown on FIG. 2. Upper bearing race 66, in the form of a disk, has external threads 68 which engage internal threads at the upper end of sleeve 16. Holes 70 may be provided to facilitate wrenching the bearing race into place with a pin wrench. Upper bearing race 66 is bored to slidably receive the hub 72 of bearing retainer 74. The upper bearing race 66 and the bearing retainer 74 may be marked to indicate the open and closed positions of the valve as shown on FIG. 3. Bearing retainer 74 has flange 76 containing diametrically opposing slots 78 for harboring and guiding balls 80. Hub 72 of bearing retainer 74 is bored to slidably receive hub 82 of lower bearing race 84. Hub 82 is provided with a key slot 86 to receive a key wrench used to turn the lower bearing race. Lower bearing race 84 has a rimmed flange 88 which is rotatable and axially movable within sleeve 16. The upper face of flange 88 contains a circumferential groove 90 of uniform depth and of such arcuate cross section as will provide a suitable race for balls 80.

Referring to FIG. 7, the bottom face of upper bearing race 66 has a pair of half circle grooves 92 of identical radius as groove 90 in lower bearing race 84. Grooves 92 are of the same arcuate cross section as groove 90 but are of varying depth, as shown on FIG. 7. The grooves are separated by holes 94, into which stop pins (not shown) are pressed, to act as stops for limiting the rotation of the balls in the grooves 92.

It is noted that, as the lower bearing race is rotated and the balls roll in the grooves, the action is comparable to the action of a screw thread and the axial movement of the lower bearing race 84 will vary with the depth of the balls in grooves 92. It is obvious that this structure will provide a low friction actuating means for obtaining a high axially applied force with a minimum amount of applied torque. If desired, grooves 92 may be made with a nonuniform rate of change in depth. Such construction may be desirable to provide rapid travel of the valve plug in its open position and less rapid travel as the valve closes, in order to firmly close the valve with a maximum amount of axial force obtained from a minimum amount of applied torque.

The rimmed flange 88 of lower bearing race 84 has a counterbore 96 to receive washer springs 98 and counterbore 100 to receive the hub of spring saddle 102. The spring saddle is bored to slidably receive plunger 104, the end of which is bored to house ball 106. As the lower bearing race 84 is rotated, springs 98 and spring saddle 102 rotate in unison. The ball 106 provides a means for transmitting the axial movement of the rotating spring saddle to the nonrotating plunger 104. The washer springs 98 provide a convenient method of transmitting axial movement from the lower bearing race 84 to the spring saddle 102 while also providing a means for absorbing over-travel and thereby preventing damage to the valve plug or valve seat.

All the elements within sleeve 16 may be retained by methods well known to the art, such as snap rings, pins and set screws.

In operation, the actuating unit 14 is removed from the valve unit 12 while the valve unit and apparatus to which it is installed are being baked.

FIG. 5 shows another embodiment of the invention in which the flat valve seat and plug are replaced by a spherical valve seat and plug. Valve seat 108 consists of a valve seat body 110 and a seat facing 112. The valve seat body may be likewise made of tungsten carbide or other suitable material having a comparable modulus of elasticity, and further having heat resistance and structural rigidity under high compression. The seat facing 112 is made of material such as used for seat facing 36 of the above embodiment and is joined to valve seat body in like manner. Valve plug carrier 114 is similar to valve plug carrier 42, previously described. Valve plug 116 is a portion of a sphere which may be of sapphire but is preferably of tungsten carbide. The valve plug 116 is carried by washer 118 which has a hole somewhat smaller than the spherical diameter of valve plug 116. The valve plug and washer are retained by a plurality of resilient clamps or clips 120 which may be spot welded to valve plug carrier 114 in such manner as will permit lateral sliding of the plug and washer under restraint. The valve plug is thus free to laterally find its normal position for proper closure against the valve seat. Although a spherical valve plug was used in this embodiment of the invention, the valve plug could as readily have been made conical or elliptical in form.

FIG. 6 and FIG. 8 depict still two embodiments of the present invention. Referring to FIG. 8, valve unit 122 is similar to valve unit 12 except for the modifications to be described below. The diaphragm 38 and flat spring 48 are replaced by an axially contractible cup member or closed end bellows 124 which is brazed to the modified body 126 as shown on FIG. 8. Valve seat 108, as described in the second embodiment of this invention may be used. Valve plug carrier 128 is similar to the valve plug carrier previously described. Valve plug 130 is a sphere which may be of tungsten carbide. Valve plug 130 is carried by washer 132 to which it is joined. The valve plug and washer are retained by ferrule 134 which may be brazed or spot welded to the valve plug carrier 128 in such manner as will permit free axial and lateral movement of the plug and washer. A wear-resistant disk 136 of tungsten carbide may be inserted into the bottom face of valve plug carrier 128. It will be noted that bellows 124 performs the function of both diaphragm 38 and flat spring 48, as used in the first embodiment of this invention.

The embodiment of the invention shown on FIG. 8 is intended primarily for use on pressure apparatus and apparatus operating with very little vacuum. The embodiment is not intended for use on apparatus operating under a high enough vacuum to collapse the bellows sufficiently to close valve plug 130 against valve seat 108.

The embodiment of this invention as shown on FIG. 6 is basically the embodiment shown on FIG. 8 with the modifications described below. A smaller diameter axially contractible cup member or closed end bellows 138 is substituted for bellows 124 and a circular flat spring 48, as used in the first embodiment is added. The valve body 126 is modified as shown to support the outer edge of the spring 48. This embodiment is primarily intended for use on apparatus operating under vacuum.

It is to be understood that the embodiments of the invention shown are susceptible to further combinations and modifications, as for example: The valve plug and valve seat shown on FIG. 2 could readily be adapted for use with the bellows shown on FIG. 8 and vice versa. For this and other reasons, it is to be understood that the embodiments of the present invention as shown and described are to be regarded as illustrative only and that the invention is susceptible to further variations, modifications and changes within the scope of the appended claims.

We claim:

1. A valve seat for use in a valve having an axially moving valve plug actuated by means generating high thrust and comprising: a metallic ring having a hardness and modulus of elasticity on the order of tungsten carbide and a seat facing diffusion bonded thereto, said seat facing being a metallic foil material more ductile than tungsten carbide and having a high width to thickness ratio providing a ductile facing the outer face areas of which resist the flow of the interior area made plastic by the extreme unit pressure on the valve plug engaging said valve seat, said foil material being selected from the group consisting of platinum, gold, silver, copper, aluminum and iron.

2. A valve seat as described in claim 1 in which the seat facing is of gold foil.

3. A valve seat as described in claim 1 in which the seat facing is of silver foil.

4. A valve seat as described in claim 1 in which the seat facing is of copper foil.

5. A valve seat as described in claim 1 in which the seat facing is of aluminum foil.

6. A valve seat as described in claim 1 in which the seat facing is of iron foil.

7. A valve seat for use in a valve having an axially moving valve plug actuated by means generating high thrust and comprising: a tungsten carbide ring and a seat facing diffusion bonded thereto, said seat facing being of platinum foil and having a high width to thickness ratio providing a ductile facing the outer face areas of which resist the flow of the interior area made plastic by the extreme unit pressure on the valve plug engaging said valve seat.

(References on following page)

References Cited by the Examiner

UNITED STATES PATENTS

| | | | |
|---|---|---|---|
| 152,844 | 7/74 | Johnston | 251—368 XR |
| 1,156,010 | 10/15 | Kenney | 251—255 |
| 1,229,579 | 6/17 | Brown | 251—254 |
| 1,245,516 | 11/17 | Sheelk | 251—333 |
| 1,410,205 | 3/22 | Madigan | 251—368 XR |
| 1,939,128 | 12/33 | Meyer | 251—86 XR |
| 1,956,027 | 4/34 | Heitman | 251—335.2 XR |
| 2,250,813 | 7/41 | Rea | 251—359 XR |
| 2,402,950 | 7/46 | Culver | 251—368 XR |
| 2,617,621 | 11/52 | Hobbs | 251—535.2 XR |
| 2,693,337 | 11/54 | Williamson | 251—87 |
| 2,716,421 | 8/55 | Bertrand | 251—368 XR |
| 2,718,235 | 9/55 | Galbreath | 251—368 XR |
| 2,740,425 | 4/56 | Garland | 251—86 XR |
| 2,771,900 | 11/56 | Dayton | 251—333 XR |
| 2,855,176 | 10/58 | Boteler | 251—331 XR |
| 2,904,877 | 9/59 | Edelen | 251—368 XR |
| 2,931,240 | 4/60 | Thungen | 74—388 |
| 2,952,439 | 9/60 | Koons | 251—85 XR |
| 3,028,874 | 4/62 | Burkett | 251—368 XR |

FOREIGN PATENTS

| | | |
|---|---|---|
| 571,561 | 3/59 | Belgium. |
| 1,095,150 | 12/54 | France. |
| 153,198 | 11/20 | Great Britain. |

ISADOR WEIL, *Primary Examiner*.